United States Patent
Xiong et al.

(10) Patent No.: US 10,498,190 B2
(45) Date of Patent: Dec. 3, 2019

(54) SERVO INCLUDING MECHANISM FOR PREVENTING ABNORMAL ROTATION OF SERVO OUTPUT SHAFT AND ROBOT INCLUDING THE SAME

(71) Applicant: UBTECH Robotics Corp, Shenzhen (CN)

(72) Inventors: Youjun Xiong, Shenzhen (CN); Youpeng Li, Shenzhen (CN); Hongyu Ding, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 137 days.

(21) Appl. No.: 15/856,055

(22) Filed: Dec. 28, 2017

(65) Prior Publication Data

US 2019/0181719 A1    Jun. 13, 2019

(30) Foreign Application Priority Data

Dec. 11, 2017    (CN) .......................... 2017 1 1305471

(51) Int. Cl.
| | |
|---|---|
| *H02K 7/00* | (2006.01) |
| *F16H 57/021* | (2012.01) |
| *H02K 7/116* | (2006.01) |
| *H02K 11/30* | (2016.01) |
| *B25J 17/00* | (2006.01) |
| *F16H 57/02* | (2012.01) |
| *F16H 1/20* | (2006.01) |

(52) U.S. Cl.
CPC ............ *H02K 7/003* (2013.01); *F16H 57/021* (2013.01); *H02K 7/116* (2013.01); *H02K 11/30* (2016.01); *B25J 17/00* (2013.01); *F16H 1/20* (2013.01); *F16H 2057/02034* (2013.01); *Y10S 901/23* (2013.01)

(58) Field of Classification Search
CPC ........ H02K 7/003; H02K 7/116; H02K 11/30; F16H 57/021; F16H 1/20; F16H 2057/02034; F16H 49/001; B25J 17/00; Y10S 901/23; Y10S 901/25
USPC ...................................................... 310/67 R
See application file for complete search history.

(56) References Cited

U.S. PATENT DOCUMENTS

| | | | | |
|---|---|---|---|---|
| 9,815,192 | B1 * | 11/2017 | Du ........................... | B25J 9/102 |
| 2018/0034348 | A1 * | 2/2018 | Li .......................... | H02K 11/30 |
| 2018/0169855 | A1 * | 6/2018 | Xiong ...................... | B25J 9/102 |

* cited by examiner

*Primary Examiner* — Michael Andrews (57) ABSTRACT

A servo assembly includes a housing, a motor, a control circuit board and a gear transmission mechanism that are arranged in the housing. The motor is electrically connected with the control circuit board. The gear transmission mechanism is rotatably connected with a motor output shaft of the motor and the servo output shaft. A servo output shaft has one end that is received in the housing and located above the control circuit board and an opposite end that extends out of the housing. A servo plate is connected to the end of the servo output shaft which is away from the control circuit board. The servo plate includes a connecting portion connected with the servo output shaft. An annular member is disposed between an end surface of the connecting portion and the housing, and the annular member is used to limit an abnormal rotation of the servo output shaft.

11 Claims, 7 Drawing Sheets

SERVO INCLUDING MECHANISM FOR PREVENTING ABNORMAL ROTATION OF SERVO OUTPUT SHAFT AND ROBOT INCLUDING THE SAME

CROSS REFERENCE TO RELATED APPLICATIONS

This application claims priority to Chinese Patent Application No. 201711305471.3, filed Dec. 11, 2017, which is hereby incorporated by reference herein as if set forth in its entirety.

BACKGROUND

1. Technical Field

The present disclosure generally relates to servos, and particularly to a servo that provides accurate output and a robot.

2. Description of Related Art

A servo is a key component of some robots, which is usually arranged in the joints of the robots to simulate the motion of a human joint. The servo typically includes a housing, a motor arranged in the housing, a reducer, an output shaft, a control circuit board and a position sensor. Generally, excessive play may exist in the transmission mechanism such as the reducer. That is, unnecessary motions may be generated due to the gaps between the engaged gear teeth. For example, when a robot arm is lifted, the arm may shake due to the gravitational attraction and the excessive play of the servo.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

In the description, relative terms such as "horizontal," "vertical," "up," "down," "top" and "bottom" as well as derivatives should be construed to refer to the orientation as then described or as shown in the drawing under discussion.

Figure 1:
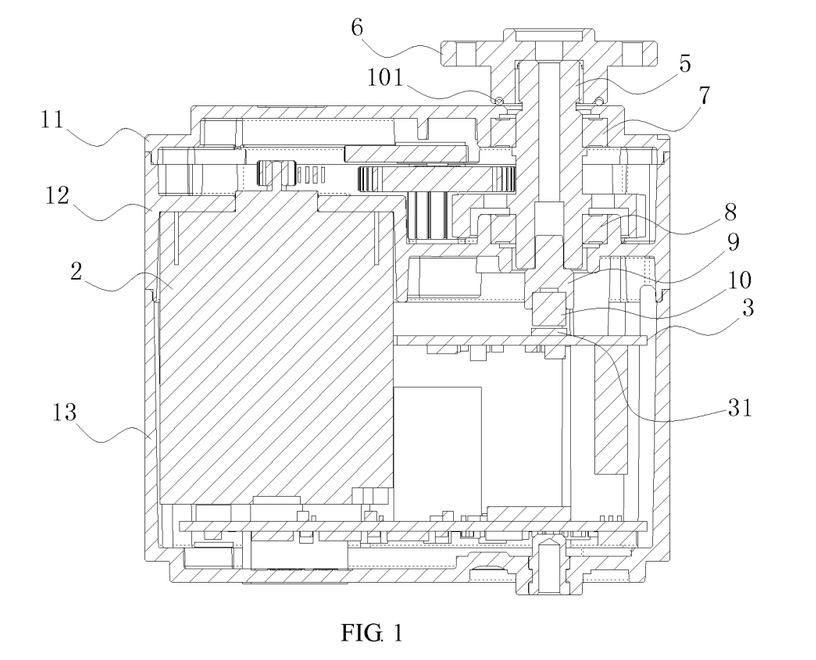
FIG. 1 is a sectional view of a servo according to one embodiment.
Figure 2:
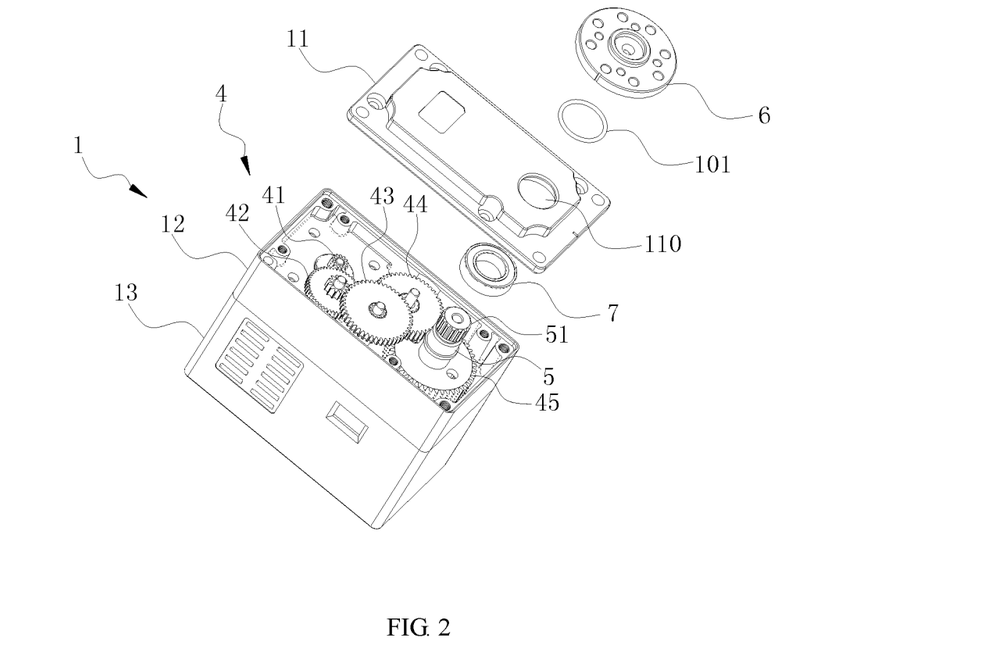
FIG. 2 is an isometric exploded view of the servo of FIG. 1.
Figure 3:
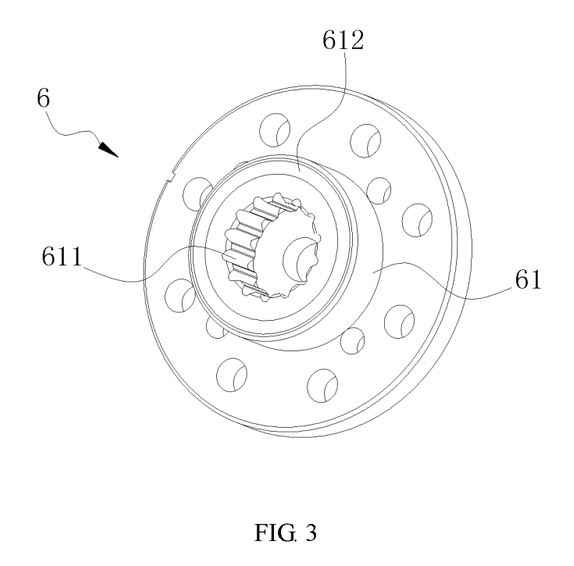
FIG. 3 is an isometric view of the servo of FIG. 1.

Referring to FIGS. 1-3, in one embodiment, a servo assembly includes a housing 1, a motor 2, a control circuit board 3 and a gear transmission mechanism 4 that are arranged in the housing 1, a servo output shaft 5 having one end that is received in the housing 1 and located above the control circuit board 3 and an opposite end that extends out of the housing 1, and a servo plate 6 connected to the end of the servo output shaft 5 which is away from the control circuit board 3. The motor 2 is electrically connected to the control circuit board 3. The gear transmission mechanism 4 is rotatably connected with a motor output shaft of the motor 2 and the servo output shaft 5. The gear transmission mechanism 4 is used to transmit the output power of the motor 2 to the servo output shaft 5. The servo plate 6 includes a connecting portion 61 connected with the servo output shaft 5. The servo assembly further includes an annular member disposed between an end surface of the connecting portion 61 and the housing 1. The annular member is used to limit an abnormal rotation of the servo output shaft 5.

In the embodiment, an annular member is disposed between the end surface of the connecting portion 61 of the servo plate 6 and the housing 1. When the servo output shaft 5 rotates, due to the frictional force between the annular member, the housing 1 and the connecting portion 61, the abnormal rotation of the servo output shaft 5 can be limited or even avoided, thereby reducing or avoiding the shaking of the robot limb caused by the excessive play of the gear transmission mechanism of the servo assembly.

Referring to FIGS. 1-3, in one embodiment, the housing 1 includes, from top to bottom, an upper housing 11, a middle housing 12 and a lower housing 13. The motor 2 and the control circuit board 3 are arranged within a chamber defined by the middle housing 12 and the lower housing 13. One end of the motor output shaft extends out of the middle housing 12. The gear transmission mechanism 4 is arranged within a chamber defined by the middle housing 12 and the upper housing 11. One end of the servo output shaft 5 that is away from the control circuit board 3 extends out of the upper housing 11. The servo plate 6 is connected to the end of the servo output shaft 5 that extends out of the upper housing 11.

Specifically, a through hole 110 is defined in the upper housing 11. The upper end of the servo output shaft 5 passes through the through hole 110 and extends out of the upper housing 11. External teeth 51 are provided at the upper end of the servo output shaft 5 extending out the upper cover 11. Internal teeth 611 are provided in the connecting portion 61 of the servo plate 6, and the internal teeth 611 are meshed with the external teeth 51.

The servo assembly further includes a first bearing 7 arranged around the servo output shaft 5 and located in the upper housing 11, and a second bearing 8 arranged around the servo output shaft and located in the middle housing 12. Specifically, a first bearing mounting portion 111 (shown in FIG. 5) is provided in a lower end surface of the upper housing 11, and the first bearing 7 is mounted in the first bearing mounting portion 111. A second bearing mounting portion (not shown) is provided in the lower end face of the middle housing 12, and the second bearing 8 is mounted in the second bearing mounting portion. The first bearing 7 and the second bearing 8 are respectively arranged around opposite ends of the servo output shaft 5 so as to allow the servo output shaft 5 to stably rotate with respect to the housing 1.

In one embodiment, the servo assembly further includes a connecting member 9 that is connected to an end of the servo output shaft 5 which is adjacent to the control circuit board 3, a magnet 10 fixed to the lower end of connecting member 9, and a magnetic coding sensor 31 disposed on the control circuit board 3. The connecting member 9 is made of a material that can be deformed to some extent. The connecting member 9 is in interference fit with the servo output shaft 5. The connecting member 9 is also in interference fit with the magnet 10 such that the magnet 10 is firmly connected to the servo output shaft 5. The magnetic coding sensor 31 is electrically connected to the control circuit board 3, and located under the magnet 10 for sensing rotation of the magnet 10. The rotation angle of the servo gear output shaft 5 can be detected based on the information output from the magnetic coding sensor 31.

In one embodiment, the gear transmission mechanism 4 includes a power gear 41, a first-stage gear set 42, a second-stage gear set 43, a third-stage gear set 44, an output gear 45, a first-stage shaft, a second-stage shaft and a third-stage shaft. The first-stage shaft, the second-stage shaft and the third-stage shaft are all parallel to the servo output shaft 5 and the motor output shaft of the motor 2. The power gear 41 is arranged around the motor output shaft of the motor 2. The output gear 45 is arranged around the servo output shaft 5. The first-stage gear set 42 is arranged around the first-stage shaft. The second-stage gear set 43 is arranged around the second-stage shaft. The third-stage gear set 44 is arranged around the third-stage shaft. The power gear 41, the first-stage gear set 42, the second-stage gear set 43, the third-stage gear set 44 and the output gear 45 are sequentially meshed with one another so as to realize the transmission of power.

The first-stage gear set 42, the second-stage gear set 43, and the third-stage gear set 44 each include a gear and a pinion that are fixedly connected and coaxial with each other. The gear of the first-stage gear set 42 meshes with the power gear 41. The gear of the second-stage gear set 43 meshes with the pinion of the first-stage gear set 42. The pinion of the second-stage gear set 43 meshes with the gear of the third-stage gear set 44. The pinion of the third-stage gear set 44 meshes with the output gear 45. In the embodiment, for each gear set, the diameter of the gear is greater than that of the pinion.

The pinion of the first-stage gear set 42 is located above the gear thereof, and the pinions of the second-stage gear set 43 and the third-gear set 44 each are respectively located below the gears thereof in order to save the internal space of the servo.

In one embodiment, the annular member is an annular washer 101 and arranged between the connecting portion 61 and the upper housing 11. An annular groove 612 is formed in the end surface of the connecting portion 61, and the annular washer 101 is partly accommodated in the annular groove 612 and thus held in position by the annular groove 612. An end surface of the annular washer 101 that is opposite to the end surface having the annular groove 612 abuts against an upper end surface of the upper housing 11.

In the embodiment, the annular washer 101 is made of a material having a large coefficient of friction. The annular washer 101 is made of a material which is stable in performance, good in wear resistance and good in deformation resistance.

In the embodiment, when installing the servo plate 6, the annular washer 101 is firstly positioned in the annular groove 612 in the end surface of the connecting portion 61 of the servo plate 6. Then, the servo plate 6 is mounted on the servo output shaft 5, and the servo plate 6 and the servo gear output shaft 5 are fixed to each other by conventional connecting techniques, such as screws. The servo plate 6 presses the ring washer 101 against the upper housing 11 of the servo. Therefore, when the servo output shaft 5 rotates, due to the friction between the annular washer 101, the upper housing 11 and the annular groove 162, the shaking of the robot limb caused by the excessive play of the gear transmission mechanism 4 of the servo can be reduced or avoided.

Figure 4:
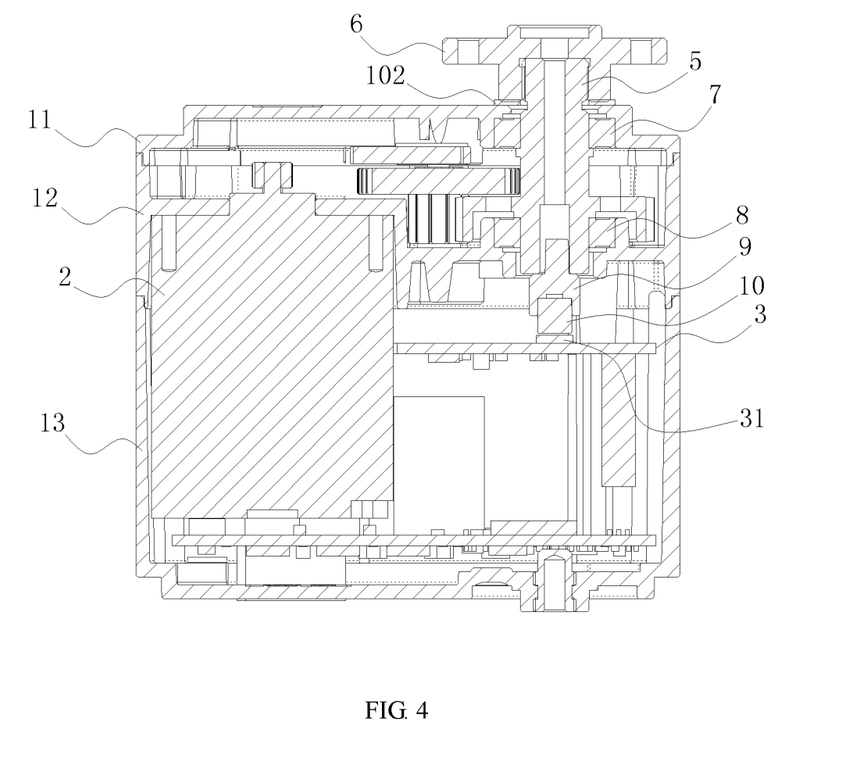
FIG. 4 is a sectional view of a servo according to another embodiment.
Figure 5:
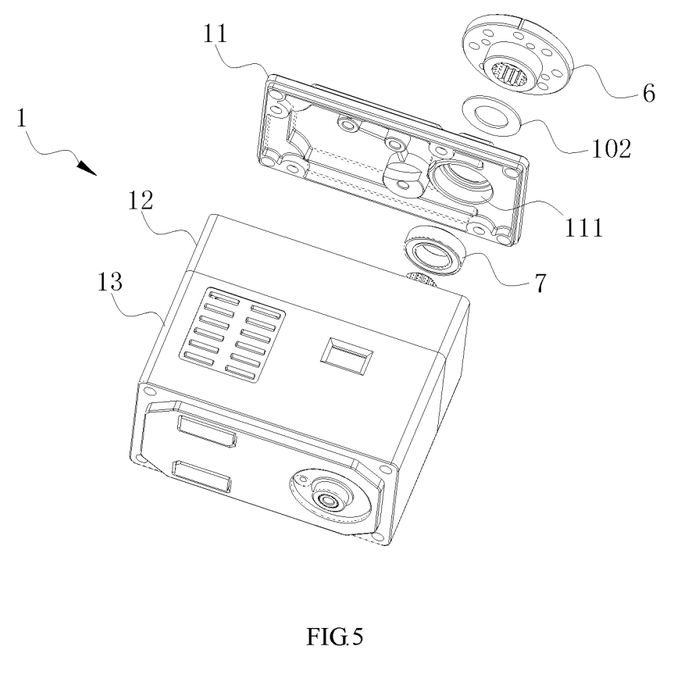
FIG. 5 is an isometric exploded view of the servo of FIG. 4.

Referring to FIGS. 4 and 5, a servo according to an alternative embodiment has a configuration similar to the servo of the above embodiments. The difference will be now described. In the embodiment, the end surface of the connecting portion 61 that is connected to the servo output shaft 5 is flat. The annular member is an annular washer 102 disposed between the servo plate 6 and the upper housing 11. The annular washer 102 is pressed against the upper housing 11 after the servo plate 6 is held in position. End surfaces of opposite ends of the annular washer 102 respectively abut against the end surface of the connecting portion 61 and the upper end surface of the upper housing 11. The annular washer 102 can be made of different materials, such as metal elastic washer, rubber, spring and the like, according to need.

Compared with the servo of the above embodiments, the annular washer 102 of the alternative embodiment has a larger contact area. Therefore, the effect of preventing the servo output shaft from rotating is better.

Figure 6:
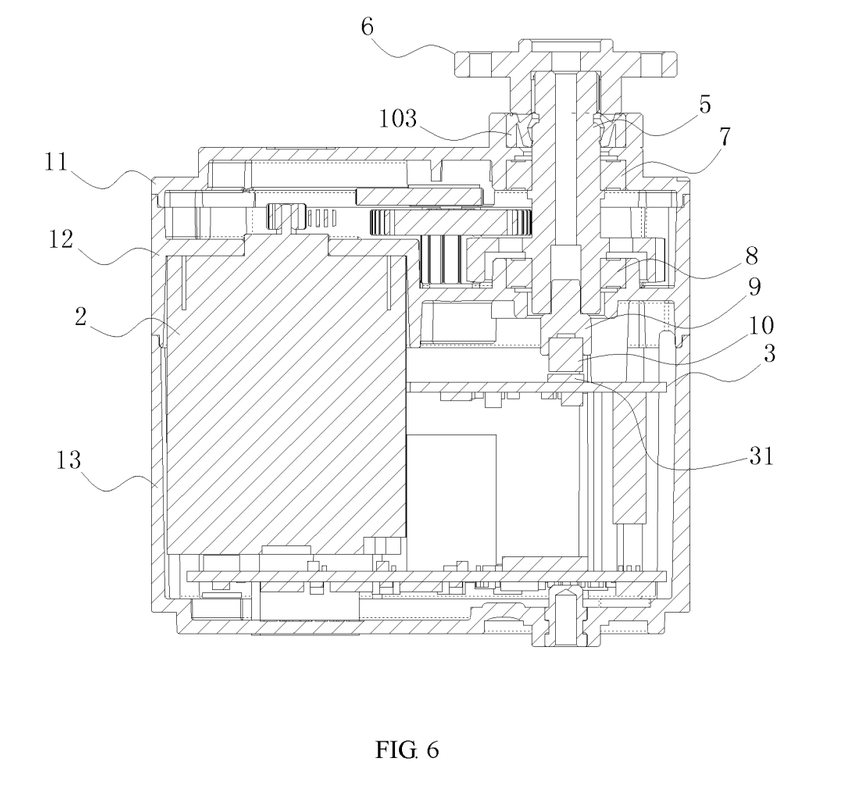
FIG. 6 is a sectional view of a servo according to yet another embodiment.
Figure 7:
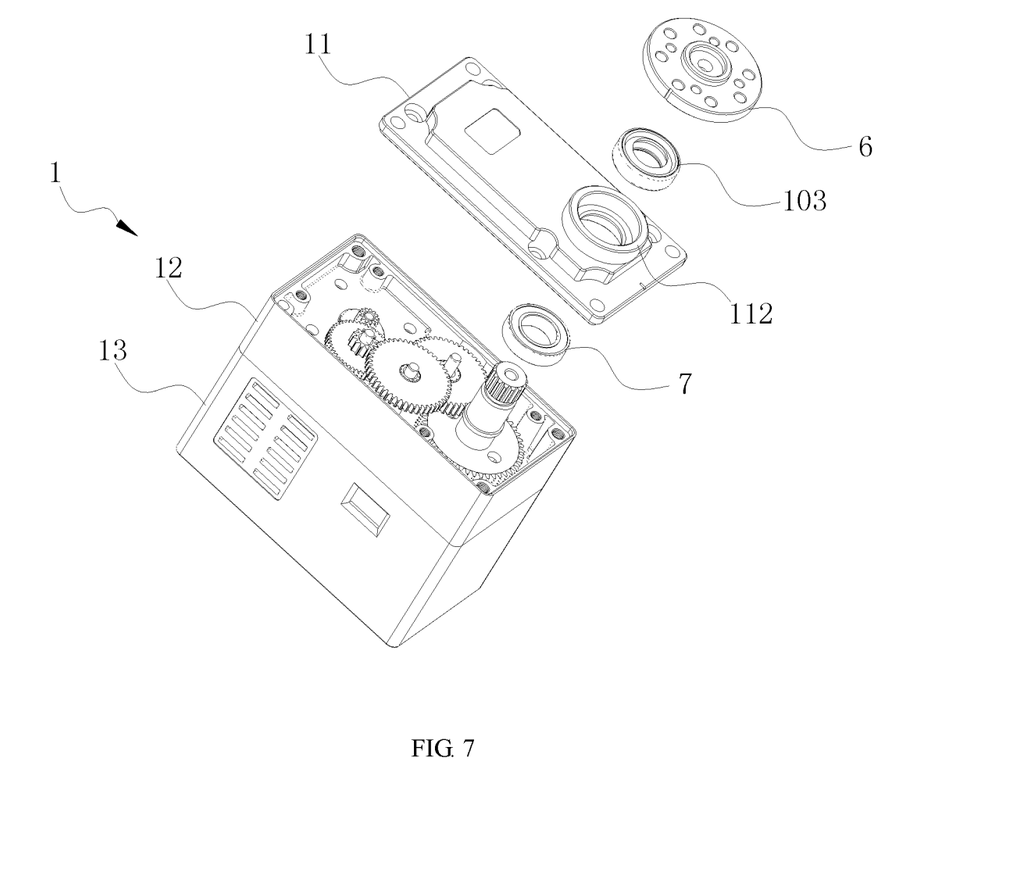
FIG. 7 is an isometric exploded view of the servo of FIG. 6.

Referring to FIGS. 6 and 7, a servo according to an alternative embodiment has a configuration similar to the servo of the above embodiments. The difference will be now described. In the embodiment, the annular member is a speed reducing ring 103. An upper end surface of the upper housing 11 includes a mounting portion 112 for accommodating the speed reducing ring 103. One end of the servo output shaft 5 passes through the mounting portion 112, and the speed reducing ring 103 is arranged around the servo output shaft 5 and located outside the housing 1. The mounting portion 112, the first bearing mounting portion 111 and the through hole 110 are coaxial with one another. The speed reducing ring 103 is a framework oil seal and is made of a material having good wear resistance.

In the alternative embodiment, the speeding reducing ring 103 is connected to the servo output shaft 5 and the mounting portion 112 in an interference fit manner. The inner surface of the speed reducing ring 103 is arranged around the servo output shaft 5, and the outer surface of the speed reducing ring 103 abuts against the inner surface of the mounting portion 112. The amount of interference can be adjusted by changing the dimensional tolerance of the servo output shaft 5 such that the frictional force can be adjusted. During assembling, the speeding reducing ring 103 is first placed in the mounting portion 112, and then the servo plate 6 is mounted on the servo output shaft 5. The length of the servo output shaft 5 can be determined according to actual needs so that the end surface of the connecting portion 61 of the servo plate 6 is in contact with or not in contact with the end surface of the speed reducing ring 103 adjacent to the connecting portion 61. In this embodiment, the end surface of the speeding reducing ring 103 adjacent to one end of the connecting portion 61 abuts against the end surface of the connecting portion 61 to further improve the effect of preventing the servo output shaft from rotating.

In summary, in the present disclosure, frictional force-based mechanism is developed on the basis of conventional servos, which reduces the abnormal changes of the servo output position caused by the excessive play of the servo, thereby effectively avoiding the shaking of robot limbs.

The present disclosure also provides a robot having the servo assembly of the above embodiments.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo assembly, comprising:
a housing;
a motor, a control circuit board and a gear transmission mechanism that are arranged in the housing, the motor being electrically connected with the control circuit board, the gear transmission mechanism being rotatably connected with a motor output shaft of the motor;
a servo output shaft having one end that is received in the housing and located above the control circuit board and an opposite end that extends out of the housing, the gear transmission mechanism being rotatably connected with the servo output shaft;
a servo plate connected to the end of the servo output shaft which is away from the control circuit board, the servo plate comprising a connecting portion connected with the servo output shaft; and
an annular member disposed between an end surface of the connecting portion and the housing, the annular member being configured to limit an abnormal rotation of the servo output shaft, wherein the annular member is a speed reducing ring, an upper end surface of the housing comprises a mounting portion for accommodating the speed reducing ring, one end of the servo output shaft passes through the mounting portion, and the speed reducing ring is arranged around the servo output shaft and located outside the housing.

2. The servo assembly of claim 1, wherein the speed reducing ring is in interference fit with the mounting portion and the servo output shaft.

3. The servo assembly of claim 2, wherein one end surface of the speed reducing ring abuts against an end surface of the connecting portion.

4. The servo assembly of claim 1, wherein the housing comprises an upper housing, a middle housing and a lower housing, the motor and the control circuit board are arranged within a chamber defined by the middle housing and the lower housing, one end of the motor output shaft extends out of the middle housing, the gear transmission mechanism is arranged within a chamber defined by the middle housing and the upper housing, and one end of the servo output shaft that is away from the control circuit board extends out of the upper housing.

5. The servo assembly of claim 4 further comprising a first bearing arranged around the servo output shaft and located in the upper housing, and a second bearing arranged around the servo output shaft and located in the middle housing.

6. The servo assembly of claim 1 further comprising a connecting member that is connected to an end of the servo output shaft which is adjacent to the control circuit board, a magnet fixed to the connecting member, and a magnetic coding sensor disposed on the control circuit board and located under the magnet for sensing rotation of the magnet.

7. A robot comprising a servo assembly, the servo assembly comprising:
a housing;
a motor, a control circuit board and a gear transmission mechanism that are arranged in the housing, the motor being electrically connected with the control circuit board, the gear transmission mechanism being rotatably connected with a motor output shaft of the motor;
a servo output shaft having one end that is received in the housing and located above the control circuit board and an opposite end that extends out of the housing, the gear transmission mechanism being rotatably connected with the servo output shaft;
a servo plate connected to the end of the servo output shaft which is away from the control circuit board, the servo plate comprising a connecting portion connected with the servo output shaft; and
an annular member disposed between an end surface of the connecting portion and the housing, the annular member being configured to limit an abnormal rotation of the servo output shaft, wherein the annular member is a speed reducing ring, an upper end surface of the housing comprises a mounting portion for accommodating the speed reducing ring, one end of the servo output shaft passes through the mounting portion, and the speed reducing ring is arranged around the servo output shaft and located outside the housing.

8. A servo assembly, comprising:
a housing;
a motor, a control circuit board and a gear transmission mechanism that are arranged in the housing, the motor being electrically connected with the control circuit board, the gear transmission mechanism being rotatably connected with a motor output shaft of the motor;
a servo output shaft having one end that is received in the housing and located above the control circuit board and an opposite end that extends out of the housing, the gear transmission mechanism being rotatably connected with the servo output shaft:
a servo plate connected to the end of the servo output shaft which is away from the control circuit board, the servo plate comprising a connecting portion connected with the servo output shaft; and
an annular member disposed between an end surface of the connecting portion and the housing, wherein the annular member is configured to limit an abnormal rotation of the servo output shaft by frictional force between the annular member, the housing and, the connecting portion when the servo output shaft rotates.

9. The servo assembly of claim 8, wherein the annular member is an annular washer, and two opposite end surfaces of the annular washer respectively abut against the end surface of the connecting portion and an upper end surface of the housing.

10. The servo assembly of claim 8, wherein the annular member is an annular washer, an annular groove is formed in the end surface of the connecting portion, and the annular washer is partly accommodated in the annular groove, an end surface of the annular washer that is opposite to the end surface having the annular groove abuts against an upper end surface of the housing.

11. The servo assembly of claim 8, wherein the annular member is a speed reducing ring, an upper end surface of the housing comprises a mounting portion for accommodating the speed reducing ring, one end of the servo output shaft passes through the mounting portion, and the speed reducing ring is arranged around, the servo output shaft and located outside the housing.

* * * * *